B. ZILLER.
DIFFUSION BLOCK FOR SUBSOIL IRRIGATION.
APPLICATION FILED DEC. 14, 1909.
968,225.
Patented Aug. 23, 1910.
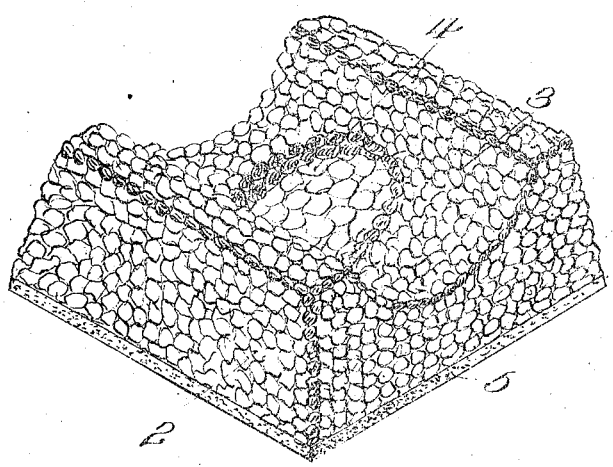
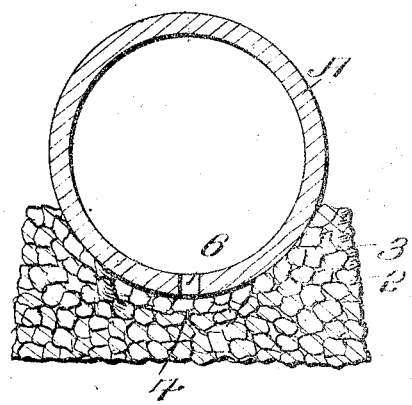
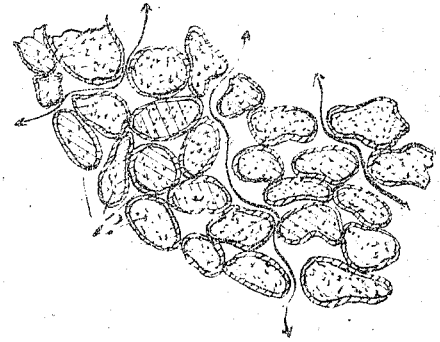

UNITED STATES PATENT OFFICE.

BESSIE ZILLER, OF AUSTIN, TEXAS.

DIFFUSION-BLOCK FOR SUBSOIL IRRIGATION.

968,225.　　　Specification of Letters Patent.　　Patented Aug. 23, 1910.

Application filed December 14, 1909. Serial No. 533,031.

*To all whom it may concern:*

Be it known that I, BESSIE ZILLER, citizen of the United States, residing at Austin, in the county of Travis and State of Texas, have invented certain new and useful Improvements in Diffusion-Blocks for Subsoil Irrigation, of which the following is a specification.

This invention relates to means for distributing water beneath the soil, and particularly to a sub-soil diffusion block which is adapted to be placed beneath a perforated pipe to receive the water dropping therefrom and to distribute the water in all directions through the soil immediately surrounding the diffusion block, the invention consisting essentially in a block composed of a mass of irregular particles touching each other at separated points and cemented to each other at their points of contact, thereby providing interstices ramifying in all directions through the block to permit the passage of water through the block.

The main trouble that has been encountered in sub-soil irrigation by perforated pipes is that roots, seeking water enter the pipe and ruin it. This is emphasized in a recently published article by W. L. Rockwell, a Government irrigation expert who says: "In southern California no expense has been spared in investigation seeking the most practical and economical methods of water distribution and sub-irrigation. Sub-irrigation for truck farms is being successfully practiced over large acreages, but the growers have been unable to make a success of sub-irrigation in the growth of trees or vines or any deep-rooted perennial crop for the reason that they have found it impossible to prevent the entrance of roots into the pipe." My invention has been constructed with this particular difficulty in view, and the diffusion block is so formed that while it permits the diffusion of water in all directions, it will prevent the entrance of roots into the pipe and consequent damage.

For a full understanding of the invention and the merits thereof, and to acquire a knowledge of the details of construction, reference is to be had to the following description and accompanying drawings, in which:

Figure 1 is a perspective view of one form of my invention; Fig. 2 is a transverse section thereof, the non-porous layer at the bottom of the block being omitted; Fig. 3 is a fragmentary section of a portion of the block, slightly enlarged over natural size.

Corresponding and like parts are referred to in the following description and indicated in all the views of the drawing by the same reference characters.

Referring to Fig. 2, A designates a pipe of any suitable material or construction, this pipe forming no part of my invention. The pipe may be made of cement, earthenware, or other material.

2 designates a block, preferably rectangular in plan, and formed so as to be extremely porous. As shown, this block is composed of large particles of gravel of more or less uniform size, this gravel being conglomerated by a binder which is applied to the face of the gravel and which causes one particle of gravel to adhere to the next adjacent particle at one or two points only, the irregular space between the particles of gravel not being filled with cement. This construction affords a block which provides for a multiplicity of ramifying channels or interstices extending in all directions, as shown in Fig. 3. In order to manufacture these porous blocks particles of solid matter are selected, having a more or less uniform size. This solid material may be shells, crushed stone, gravel, cinders, or any other like material composed of more or less irregular particles of a relatively large size. The particles of this material are coated with a thin layer of cementitious material. The mass is then placed within a mold, the cement or binder binding said coated particles to form a discontinuous mass, the particles of which touch each other only at separated points, thus leaving a large number of irregular and tortuous passages extending through the mass and around each particle. A mass of this character is permeated in all directions by these tortuous channels, and consequently when one of the channels is closed by any chance, there will be many more channels leading therefrom through which water may pass. Thus, the mass is consistently porous throughout its whole extent, not merely porous in places, as would be the case were it formed with artificial passages. Preferably, the form of the block is rectangular in plan, the upper surface being curved, as at 3, for engagement with the bottom of the pipe, while the center of the block is formed with a depression 4 constituting a water-collecting chamber. If it is desired to prevent the passage of water through the bottom of the block, as is the case under some circumstances, I apply to the bottom of the block a solid mass of cement which is impervious to water and is designated by the numeral 5 in Fig. 1. These blocks 2 may be placed along the pipe in any desired position and at as frequent intervals as desired. It is only necessary to pierce the pipe with a passage 6, the chamber 4 being located in register with this passage.

In operation, when the water enters the chamber 4 from the pipe A the air is forced out ahead, and the chamber becomes filled with water which, from this reservoir is then distributed evenly throughout the entire mass and finds an exit through the interstices between the pebbles as previously described, and the soil is fed from all sides as by a sponge which is being constantly replenished by water passing through the pipe A, through 6, into the chamber 4.

The advantages of my invention are as follows: The block forms no part of the pipe, and hence there is no such difficulty in manufacturing the block as is found in manufacturing porous pipe of the same class. In making porous pipe, partly or entirely of gravel or like material, the pipe has to be left in the mold to set, before it can be removed, which necessitates a great number of molds, considerable expense and great inconvenience. This inconvenience is not encountered in the manufacture of this porous diffusion block. The block is cast with the curved face down, and the bottom being flat, it is simply turned out of the mold onto a board, and left to dry. Thus a great number can be made in a short time and at little expense. Being no part of the pipe, it can be attached to any pipe or to any part of a pipe, as circumstances demand, by simply punching a small hole in the pipe and placing the device so as to extend across the opening thus formed. Therefore, it can be placed on pipe that is already beneath the soil, whether the pipe be vitrified pipe, cement pipe, or whatever its nature. In other words, these diffusion blocks can be placed in the desired locations, as far apart on the pipe as desired, and on any character of pipe. In case of accident to the blocks, these blocks can be removed and new ones substituted, without removing the pipe or in any way interfering with it. Inasmuch as the number of these blocks is not limited, as many may be placed upon a pipe or line of pipe as the character of the soil that is to be irrigated demands. It will thus be seen that the diffusion blocks have in this respect considerable advantage over perforated pipes for this purpose; are more or less uniformly porous, and the degree of their porosity can be changed to suit varying circumstances. When the diffusion blocks are placed beneath the pipe, the block is always safe from accidental injury, as from a plow or cultivator, and furthermore, the block acts as a support to the pipe, giving it a solid, flat foundation upon which to rest, thus tending to prevent the pipe from settling and so becoming leaky.

As before stated, these diffusion blocks are constructed with particular regard to preventing the entrance of roots into the pipe, and the consequent damage thereto. To be successful in this respect, a pipe must discharge its water from the bottom. This is true, because in no other way can a pipe empty itself of every drop of water, and unless it is entirely emptied, the water which remains in the pipe will seep through in places and attract roots, and thus the pipe will shortly be split and ruined. My diffusion blocks permitting the holes to be formed in the bottom of the pipe, the pipe will always empty itself, and when the water is cut off, what remains in the pipe will continue to flow out through the holes in the bottom of the pipe, passing out through the chamber 4 and thence through the diffusion block, into the soil. The reason why the roots will not seek the openings 6 in the pipe, is that the block will hold no water, and hence the block will be no more moist than all the soil around it. After the water is cut off, the pipe itself and the block beneath become dry, and therefore do not attract roots. It might be supposed that the pipe could be laid without the block, and have simply a row of holes in its bottom through which the water would flow and enter the soil. While this could be done, the water passes through the holes and forms a jet and makes a puddle beneath the pipe, and the onrushing flow of water down the pipe will soon draw slush up into the pipe, through the opening 6. Further, a proper diffusion of water could not be secured in this way, inasmuch as in order to secure this proper diffusion, as much surface as possible must be wet. It is this that makes the chamber 4 of great importance. It being larger than the opening 6 in the pipe, it presents a larger area for action. No dirt can be sucked up into the pipe, as this chamber communicates with the outside surface of the block through the many passages, and thus distributes the draw of the water until it practically amounts to nothing. Further, it will be obvious that the water will be far more widely and equally diffused than it could be did it simply rush out of the openings 6 in the form of jets that would soak into the ground beneath, but would not be distributed over any large area of contact with the earth. Another advantage gained by having the gravel cemented into the form of a block, is that if a mass of loose gravel were to be placed beneath the opening to the pipe, there would be no way of knowing whether or not one of the grains or particles had become located directly beneath the opening 6 and so closed it up that the water could not get out. The same would be more or less true if the mass of gravel was formed into a block and no chamber 4 was provided. By providing this cup-shaped depression 4, it is impossible to obstruct the opening 6 from without. A further advantage of this cup-shaped depression or chamber is that if any one or several of the openings leading from the cup should become clogged, there is a wide area in the cup filled with like openings, and many other passages will always be open for the passage of water from the cup outward.

Another advantage incident to the use of these diffusion blocks is that whereas a pipe perforated at intervals upon its bottom and resting upon the ground or supported at its ends so that a space would be left between the bottom of the pipe and the earth, would be weakened to such an extent that the pipe would be very liable to burst under pressure, or crack, by the use of my diffusion blocks, it is possible to perforate a pipe at a number of places along its bottom, without weakening the pipe, for the reason that the pipe, immediately around the perforation, is fully supported by the diffusion block, while the diffusion block would prevent the earth from collecting immediately around the perforation of the pipe and from stopping up the opening thereof.

While I have shown my diffusion block as being applied beneath a pipe, it is of course obvious that the block might be applied to other portions of the pipe if circumstances rendered it necessary, as would sometimes be the case. Neither do I wish to be limited to the precise form of the block shown, as the form of the block might be varied in many ways without departing from the principle of my invention.

Having thus described the invention, what I claim is:

1. As an article of manufacture, a sub-soil diffusion block composed of a mass of irregular particles touching each other at separated points and cemented to each other only at their points of contact, thereby providing interstices ramifying in all directions through the block to permit the passage of water through the block.

2. As an article of manufacture, a sub-soil diffusion block composed of a mass of solid particles, said particles being each coated with a layer of cementitious material, said particles touching each other only at separated points and adhering together at these points to form a discontinuous mass, thereby providing interstices ramifying in all directions through the block to permit the passage of water through the block.

3. As an article of manufacture, a sub-soil diffusion block composed of a mass of solid particles touching each other only at separated points, and cementitious material disposed at said contacting points and causing said particles to adhere to each other at such points, thereby providing interstices between the particles ramifying in all directions through the block and opening upon the outer face of the block.

4. As an article of manufacture, a sub-soil diffusion block composed of a mass of solid particles touching each other only at separated points, and cementitious material disposed at said contacting points and causing said particles to adhere to each other at such points, thereby providing interstices between the particles ramifying in all directions, said block having a water collection chamber in its upper face.

5. As an article of manufacture, a sub-soil diffusion block composed of a mass of solid particles touching each other only at separated points, and cementitious material disposed at said contacting points, thereby providing interstices between the particles ramifying in all directions, said block having a substantially concave upper face formed with a depression forming a water collection chamber.

6. As an article of manufacture, a sub-soil diffusion block composed of a mass of solid particles touching each other only at separated points, and cementitious material disposed at said contacting points and causing said particles to adhere to each other at such points, thereby providing interstices between the particles ramifying in all directions, said block having a concave upper face with a depression in the center forming a water collection chamber and a flat lower face, the lower face being covered with a solid layer of cement.

7. The combination with a water conducting pipe having a perforation in its wall for the outward passage of water, of a diffusion block extending across said opening and composed of a mass of irregular particles touching each other at separated points and adhering to each other only at their points of contact thereby providing interstices between the particles ramifying through the mass to permit the passage of water through the block.

In testimony whereof I affix my signature in presence of two witnesses.

BESSIE ZILLER. [L. S.]

Witnesses:
F. M. MADDOX,
HERMAN PRESSLER.